May 8, 1951            E. WITTE            2,551,861
TRASH SWEEPER
Filed Dec. 22, 1945            4 Sheets-Sheet 1
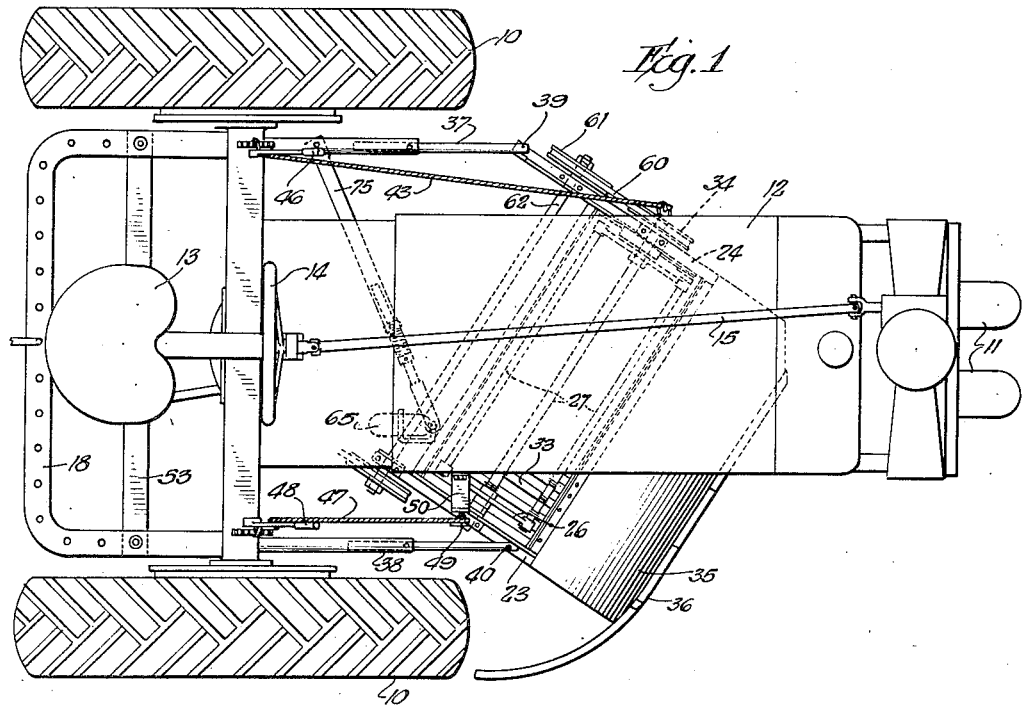
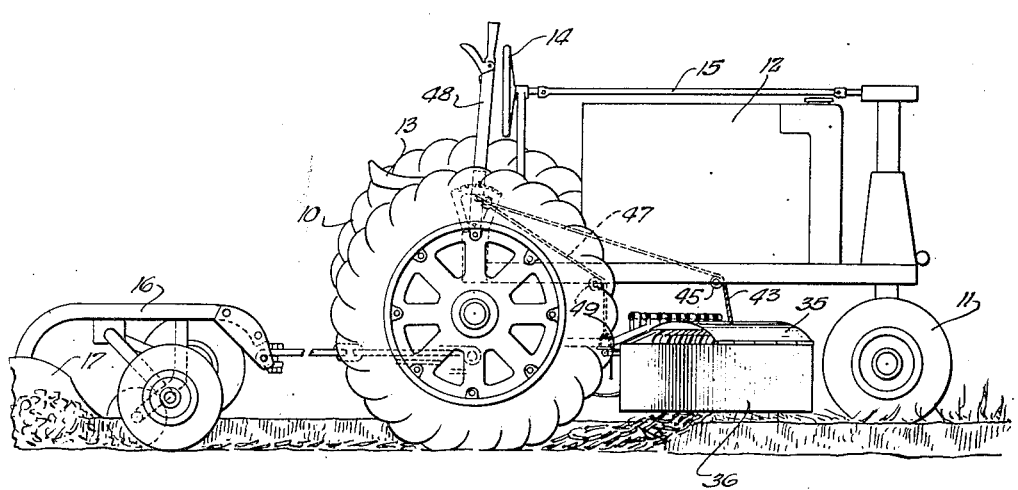
Inventor
Edward Witte
Attys.

May 8, 1951
E. WITTE
2,551,861
TRASH SWEEPER
Filed Dec. 22, 1945
4 Sheets-Sheet 2
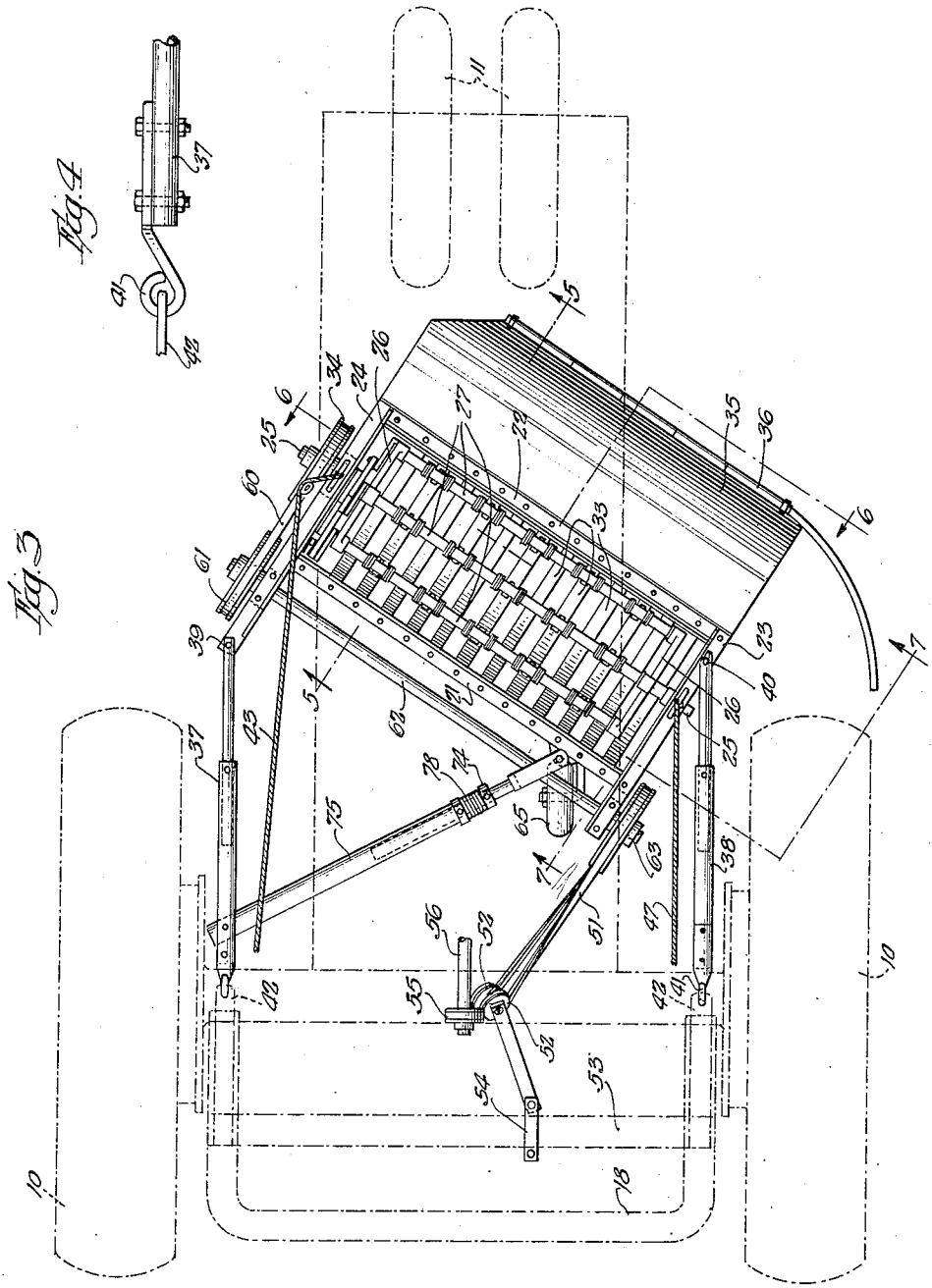
Inventor:
Edward Witte
by Thiess, Olsen & Mecklenburger
Attys.

May 8, 1951  E. WITTE  2,551,861
TRASH SWEEPER
Filed Dec. 22, 1945  4 Sheets-Sheet 3

Inventor
Edward Witte
by Thiess, Olson & Mecklenburger
Attys.

May 8, 1951 — E. WITTE — 2,551,861
TRASH SWEEPER
Filed Dec. 22, 1945 — 4 Sheets-Sheet 4
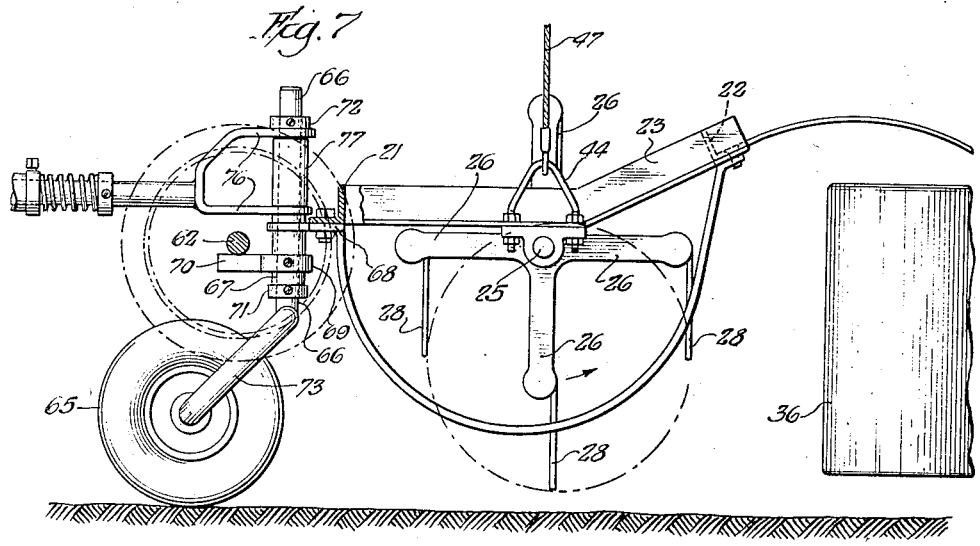
Inventor
Edward Witte
By Thiess, Olsen & Mecklenburger
Attys.

Patented May 8, 1951

2,551,861

UNITED STATES PATENT OFFICE 2,551,861

TRASH SWEEPER

Edward Witte, Des Moines, Iowa

Application December 22, 1945, Serial No. 636,651

8 Claims. (Cl. 97—35)

This invention relates to and has for an object the provision of means for sweeping or collecting corn stalks, bean refuse, straw, surface vegetation, or other surface litter, trash or rubbish which has been worked down upon the surface of the ground preliminary and preparatory to plowing, and to deliver the collected matter immediately ahead of the right-hand rear or furrow wheel of the tractor by which it is compressed and crushed into the bottom of the plowed furrow and is deeply and thoroughly buried in the ground by the plow attached to and drawn by the tractor in the rear of the said wheel, which in the same operation folds the newly plowed ground completely over the compressed litter in the bottom of the furrow.

The successful plowing under of such surface trash has always been a problem to the farmer. If it does not lie just right, and it usually does not, the trash protrudes more or less at the edge of the furrow intended to cover it and is not buried in the soil as desired. It tends to bunch up in front of the plow and under the beam and may even throw the plow out of the ground if not loosened in some way. If the bunch loosens itself or is loosened by hand, it lands in the furrow and is too large to be completely folded in and covered by the soil from the furrow following. The result is a poorly and unevenly plowed field and with rows and bunches of trash protruding and incompletely covered along the furrows.

The deep and thorough burying and coverage of such litter is not only deemed essential to the good working and maintenance of the fertility of the soil in modern farming practice but is especially important with the increased prevalence of the corn borer, the best known remedy to control which is to thoroughly bury the previous season's corn stalks which have become infested therewith. But corn stubble is especially difficult to plow under completely so that stalks will not protrude more or less at the edges of the plowed furrows. A few stalks of corn or wisps of straw protruding from a plowed field are ideal havens for corn borers and tend to defeat the cure for them. The deep and thorough burying and covering of the surface trash tends also to combat and destroy other destructive insects, such as grasshoppers, southern corn rootworm, root aphids, grape colaspis, webworms, cutworms, and the like. Manure should be plowed under thoroughly to kill insects and weeds, and to give the maximum benefit to the soil.

The method of this invention also eliminates the disposal of such material by the separate operations of raking and of burning, which are unsatisfactory ways more or less frequently resorted to, and saves the humus of such material for the benefit of the soil, and requires no separate time, labor or operations on the land to dispose of the same.

An object of the invention is the provision of a plowing tractor with a trash-sweeping, collecting or raking means for sweeping a strip of the surface alongside the furrow already plowed and as wide as that to be plowed and delivering the collected matter into the furrow immediately in front of the wheel of the tractor which runs in the plowed furrow and by which such trash is compressed and crushed down into the bottom of the furrow so that it is deeply and completely buried and covered by the plow drawn by the tractor and following the wheel.

Further objects of the invention are to provide a sweeper which is relatively small and located underneath the body of the tractor and is carried along thereby; to provide a sweeper of the rotary type and power-driven from the tractor, which may be regulated as to speed of rotation and is not dependent on traction wheels for its operation; to provide a sweeper which is adjustably supported to adapt it to the different conditions met with in use and to the tip or slant of the tractor by reason of one wheel running in the furrow, and to provide a reel rake type of sweeper with a confining and directive shield properly to form and deliver the trash in a more or less compact roll into the furrow just in front of the tractor wheel, whereby it may be crushed into the bottom of the furrow and completely covered by the plow following the wheel, the shield also preventing interference by wind with the proper operation of the sweeper.

A further object is to arrange the sweeper to deliver the collected material at the side into the plowed furrow immediately in advance of the tractor or furrow wheel therein, and to accomplish the same in part by arranging it at an angle to the line of travel of the tractor so that the material raked is continuously urged and rolled to that side and is delivered in a continuous stream or roll into the furrow at the desired place.

Other objects, features and advantages will appear from the detailed description and claims to follow in connection with the accompanying drawings illustrating an embodiment of the invention by way of example and not of limitation, and in which—

Fig. 1 is a plan view of a tractor with the sweeper attached;

Fig. 2 is a side elevation of the same at a reduced scale and showing the plow in part attached to the tractor;

Fig. 3 is a plan view in larger scale of the sweeper portion of the machine, the outlines of the tractor being indicated in dotted lines;

Fig. 4 is a detail sketch of the connection of the sweeper side rod to the tractor frame;

Fig. 7 is an end, partially sectional, view of the sweeper on the angular line 7—7 of Fig. 3; and Fig. 8 is a plan view at a reduced scale showing a tractor, sweeper and plow in relation to the furrow.

Figure 5:
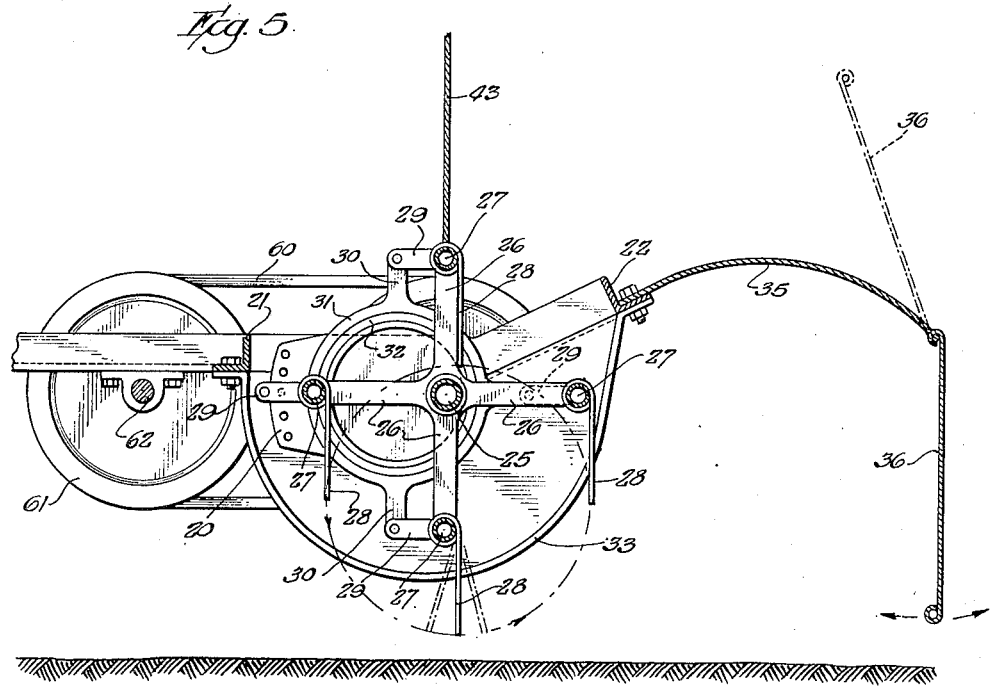
Fig. 5 is a cross-sectional view of the sweeper on the line 5—5 of Fig. 3.

In these figures, a conventional plowing tractor is indicated having the usual large drive wheels 10, the small front steering wheel or wheels 11, a body, chassis or framework connecting the same, and a power plant 12 including a motor which is connected by suitable transmission mechanism with the drive wheels to propel the tractor. A driver's seat 13 and steering wheel 14, suitably connected by shaft 15 with the front wheels 11, are provided. A plow 16 of the usual or desired type having one or more furrow-turning plows 17, in this instance two plows 17, is drawn by the tractor and is suitably connected thereto at the drawbar or rear transverse part 18 of the draw frame of the tractor. The right rear wheel of the tractor, when plowing, runs in the previously plowed furrow and the plow immediately following the wheel turns the newly plowed strip over into the old furrow behind the wheel. The other plows, if used, follow successively after the first. All this is old and well understood and is therefore only conventionally shown.

For the usual plowing, as shown, the right rear wheel of the tractor travels in the furrow previously plowed. This is a comparatively large, wide wheel and carries a heavy load. As previously stated, the problem of getting the surface trash properly plowed under has always been a difficult one to the farmer, and now with the apparent increase of harmful insects, such as the corn borer and others, it becomes doubly important that such material be deeply plowed under and completely covered in the ground.

Accordingly, in this invention the tractor is provided with means for sweeping the surface trash into the old furrow just in advance of the large, heavy tractor wheel therein which crushes it down beneath it into the bottom of the furrow so that the plow immediately following the wheel is enabled completely to cover the same.

The means for so sweeping the trash into the furrow comprises preferably a relatively small rotary side-delivery sweeper which is constructed to fit and be carried beneath the tractor frame midway of the front and rear wheels of the tractor, and of a length to rake or sweep a strip of unplowed or land surface alongside the already plowed furrow and as wide as the strip to be plowed by the plow or plows drawn by the tractor, which in this instance are preferably two plows. With such a sweeper the trash material is caused to form into a small roll which travels to the side and is delivered neatly into the furrow as a continuous roll which is crushed into the bottom of the furrow by the tractor wheel and completely covered by the plow following the wheel. Thus, the sweeper comprises a rigid rectangular, horizontal reel frame having the rear and front side members 21 and 22 and end members 23 and 24, preferably of angle iron, with the horizontal flange turned outwardly and secured together at the corners, as by welding or bolting or in any desired manner. These end members are slanted upwardly slightly at their forward ends, as indicated in Figs. 5 and 7, for reasons hereinafter explained. Centrally and longitudinally of this frame, a shaft 25 is journalled in suitable bearings on the under side of the end members 23 and 24. A spider, having in this instance four arms 26, is suitably mounted on and secured to revolve with the shaft 25, one at each end, and inside the ends 23 and 24 of the reel frame. In the ends of corresponding arms 26 of these spiders the sweeper teeth supporting bars or shafts 27 are carried and are rotatably mounted therein in any suitable bearings, preferably roller bearings.

These shafts 27, which extend parallel with the center shaft 25, carry the rake teeth 28 which are of heavy spring metal rod coiled about the shaft 27 several times at their upper ends, as indicated, and firmly secured nonrotatively thereto in any desired manner. A common way is to form adjacent pairs of teeth in one piece with a bolt through the shaft 27 engaging the intermediate part joining the teeth alongside the shaft to prevent rotation of the pair on the shaft. The teeth 28 are placed at intervals along the shafts 27, five such pairs being shown in this instance on each shaft, though their number may be varied as desired.

These teeth 28 are intended to stand substantially vertical while doing their work of sweeping as they move forwardly in the rotation of the sweeper when the main shaft 25 is rotated by power applied thereto, and accordingly the shafts 27 must remain in the same relative positions. This is brought about by providing the shafts 27 at one end, the left end in this instance, with arms 29 rigidly secured thereto. The ends of these arms are rotatively connected or side-pivoted to the ends of other arms 30 rigidly affixed to a cam ring or strap 31 and extending radially outward therefrom. This ring or cam strap 31 surrounds and freely rotates on the periphery of a circular stationary cam ring 32 located on the inside face of an adjusting plate 20 adjacent the end 24 of the rectangular reel frame of the device. This cam is eccentrically placed with reference to the power shaft 25 which passes through it and through the plate 20 and in devices of this nature is frequently referred to as the eccentric cam. Suitably placed friction rollers may take its place, if desired. This cam may be adjusted, if desired, by adjusting the plate 20 about the shaft 25 to vary the angle of the teeth 28 slightly from the vertical, as indicated in dotted lines in Fig. 5, should such variation be desired. Several holes through the rearward end of plate 20, through which a bolt may be inserted, are provided for such adjustment. Such bolt may extend through a suitable hole in the end cover plate 19 of the lower half of the reel.

As thus constructed, it is apparent that when power is applied to the shaft 25 to rotate it, the arms 29, shafts 27 and teeth 28 will maintain their positions shown relative to the horizontal and vertical and the teeth 28 remain substantially vertical.

Figure 6:
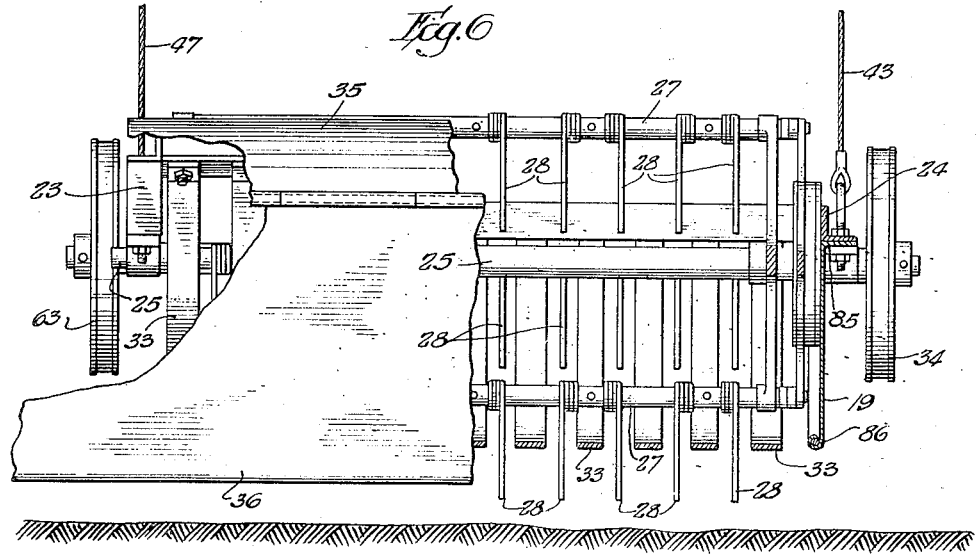
Fig. 6 is a front view partially sectional of the same on the angular line 6—6 of Fig. 3.

Since the teeth of the sweeper raise and lower in their operation of sweeping the trash forwardly, semi-circular guard rails and stripper bars 33 are preferably secured at their ends to the horizontal flanges of the sides 21 and 22 of the reel frame, as indicated, and between the teeth 28, as shown in Figs. 3 and 6 and elsewhere, though any desired number and arrangement may be used. The reel frame itself may be about sixteen to eighteen inches in width and three and a half to four feet long, or other desired size within the limits available.

A belt pulley 34 is shown located on the projecting left end of the main shaft 25 of the reel through which power is applied to the sweeper reel to rotate the same in a counterclockwise direction as viewed in the drawings and indicated by the arrows. The pulley 34 is driven by a short belt 60 from pulley 61 on the end of shaft 62 which is alongside the rear rail 21 of the reel frame and is journaled at its ends in bearings carried respectively by rearward extensions of the ends 23 and 24 of said reel frame. A driving belt pulley 63 is mounted on the right-hand end of this shaft 62 and is driven from the power take-off of the tractor, as will be described. V-belts and pulleys preferably are used throughout. In this manner the sweeper unit is operated rotatively.

A curved sheet-metal shield 35 secured to the front frame member 22 of the reel, as by bolting thereto, and having a hinged portion 36, is provided to facilitate collecting the trash, forming it into a suitable confined roll and guiding it to and down into the furrow. This shield serves as a baffle or stop plate against which surface litter may be thrown and prevents any scattering of the material. It also serves as a wind break to prevent the lighter material from being blown back or around. The shield portion 35 may be curved or cut off at its left-hand corner to prevent interference with the front wheels or other objects. The hinged portion 36 of the shield may be turned up as indicated in dotted lines, Fig. 5, to permit access to the reel. Any obstructions striking the same when in use will merely swing the cover back so as to pass over same.

The unit as thus constructed is attached underneath the tractor by extensible members 37 and 38 (Fig. 1) which may be in the form of telescoping pipes capable of fixed adjustment as to length in the usual manner as indicated. The forward end of pipe or rod 37 on the left side is somewhat loosely bolted for limited play, as at 39, to the rearward extension of the end member 24 of the reel frame, and the rod or pipe 38 at the right is similarly secured to the other end member 23 of the reel frame, as at 40. The rear ends of these pipes or rods 37 and 38 may be secured to the framework of the tractor in any desired way to permit the unit to be raised and lowered and adjusted in position, and to hold its position laterally and longitudinally with respect to the tractor body and to receive any backward thrust of the sweeper, in operation or otherwise. As shown in Fig. 4, a short metal strap or bar may be secured to the end of each pipe or rod 37, and also of rod 38, with its end formed into an eye or loop 41. This eye passes through an opening in the end of another bar or strap 42 forming a bracket or member which may be conveniently bolted or otherwise secured to the under side of the end member of the drawbar frame 18 of the tractor or other adjacent part of the tractor frame. The telescoping ends of the pipes 37 and 38 enable ends of the sweeper frame to be adjusted laterally and longitudinally of the tractor as well as angularly to adapt the sweeper to varying conditions, and they may be secured in adjusted positions by bolts therethrough, set screws or in any desired way, as indicated.

The sweeper unit is vertically supported from above in the tractor frame in a manner to permit it to be raised and lowered bodily so that it may be elevated out of sweeping position or be lowered to the desired extent for sweeping. This is accomplished in this instance by two flexible wire cables, one at each end of the sweeper frame, the cable 43 at the left end being attached substantially centrally to the end 24 of the reel frame of the unit, as by a loop like that at 44 in Fig. 7. This cable then extends up over a pulley 45, Fig. 2, suitably attached to the tractor frame and thence to the rear to a hand lever 46 on the tractor adjacent the driver's position, by which lever and cable the end of the rake or sweeper may be raised and lowered in the well-known manner and carried in any desired adjusted position. The other cable 47 at the right side of the tractor attaches to the hand lever mechanism 48 and, passing over pulley 49 suitably attached by bracket 50, Fig. 1, to the tractor frame, then extends down and is similarly secured to the end 23 of the reel frame by loop 44. By this means the right end of the sweeper may be raised and lowered and held in any adjusted position. By these levers and cables the sweeper frame may be adjusted to the desired position for best sweeping the trash according to the conditions, or be raised out of working position when desired. Other means may, of course, be provided for the purpose, but the construction described has been found practical.

The sweeper is preferably driven rotarily by power from the tractor motor and is therefore independent of the traction wheels. This may be accomplished in various ways. In the way illustrated particularly in Fig. 3, the belt drive pulley 63 on the end of the sweeper shaft 62 is connected by a V belt 51, which runs over guide pulleys 52 adjustably secured to and along a member 53 of the drawbar frame of the tractor, as at 54, and thence over a drive pulley 55 located on the usual power take-off shaft 56 of the tractor, which, as is usual, is driven by the tractor motor.

By this means the rotary sweeper is power-driven. The belt may be adjusted, if desired, by the adjustable attachment 54 of the guide pulleys and the speed of operation may be varied by changing the size of drive pulley 55 or pulley 63, or both. The guide pulleys may be on separate brackets independently adjustable along their support, if desired. Variable speed gears may be used in connection with the power take-off, if desired, or if the reel be rotated at a constant speed by the motor the variable speed transmission of the tractor may be used to effect a slowing up of the tractor and a more rapid rate of rotation of the sweeper relative to the distance covered by the tractor be obtained.

A castor wheel 65 (Figs. 1, 3 and 7) may be provided, preferably near the right rear corner of the frame of the sweeper, and serving, among other purposes, to keep the sweeper from tearing into the ground too deeply when the tractor wheel may drop into low or uneven places in the field. This castor wheel is preferably equipped with a pneumatic rubber tire. This castor wheel 65 may be supported on a vertical shaft 66 passing up through a sleeve 67 having a forwardly extending plate-like bracket 68 attached at its upper end and suitably bolted to the underside of the reel frame member 21 (Fig. 7). This sleeve 67 may also have a collar 69 adjustable thereon and held in place, as by a set screw or bolt, said collar having an arm 70 projecting rearwardly underneath and in contact with the shaft 62. This arm lends its support to the bracket 68 against any tendency of the sleeve 67 to rotate vertically when the wheel 65 strikes an obstruction, or at other times.

An adjustable collar 71 on this vertical shaft 66, secured in adjusted position therealong by a set screw or bolt, is located at the lower end of the sleeve 67 and affords a rotative bearing therefor. A similar adjustably fixed collar 72 is at the upper end of shaft 66, above the upper leg of a fork to be described later. By means of these two adjustable collars 71 and 72 the position of the castor wheel 65 may be vertically adjusted with respect to the sweeper unit.

This adjustment is desirable because of the varying condition of the trash on the ground which may be encountered. If the trash is loose and more or less light, the teeth 28 of the sweeper may operate at about two inches from the ground at their lowest points, but with heavy material or in the spring when the trash has been on the ground all winter and is more or less tight to the ground, the teeth may have to be set almost or quite to touch the ground in order to sweep the material loose.

The vertical shaft 66 may extend or be bent laterally below the collar 71 to a point slightly beyond the side of the wheel 65, thence downwardly and rearwardly, as at 73, to the center of the wheel and then back again laterally to form the axle of the wheel, thus lining up the central plane of the wheel with the vertical shaft. This gives the wheel a castor-like mounting and action, the same being rotative on the vertical axis of shaft 66, and, owing to the slanting portion 73, a tendency to follow in line with the shaft and sweeper.

A diagonal bracing rod or pipe 75 may be bolted with a suitable clearance at its rear end to the pipe 37 or in that vicinity and at its forward end be forked, as at 76, to slip over the upper end of the castor spindle or shaft 66, a sleeve section 77 being on the shaft 66 between the forks 76. This pipe 75 consists also of telescoping sections, as indicated, with a coiled spring 78 between the end of the larger section and an adjustable collar 79 on the smaller section, the latter being secured in any adjusted position by set screws or bolts in the usual manner. This rod or pipe 75 through the forked connection at its forward end and connection at the rear end prevents the reel frame from rocking in the operation of the sweeper or swinging laterally on its suspensions and from getting out of the longitudinal, lateral or angular position to which the same may be adjusted by the side rods 37 and 38. The diagonal rod 75 is provided with set screws or bolts or other means at the telescoping sections to enable them to be rigidly connected when the adjustments have all been made. The spring 78 is useful during adjusting of the tautness of the drive belt by tending to keep it taut while the adjustment of the guide pulleys 52 is made, the set screws or bolts between the sections of rod 75 being at the time released.

The semi-circular sheet-metal cover plate 19 over the lower part of the left end of the sweeper reel, as indicated in Fig. 6, has its upper edge outturned, as at 85, which is suitably bolted to the underside of the horizontal flange of the end member 24 of the reel frame. Its free edge follows substantially the same curve, size and outline as the stripper bars 33 and is preferably strengthened and provided with a smooth curved edge by turning or forming the edge inwardly over a rod or wire, as shown at 86. This cover plate thus acts as a shield and tends to prevent the undesired entrance of trash or litter into the inside of the reel at this end during the operation of the sweeper and to separate the unswept from the swept trash.

The stripper bars 33 are preferably relatively wide, as indicated, to present a broad surface to the trash, to assist in rolling it ahead and toward the end, and effectively to strip the trash from the teeth 28 of the sweeper, as well as to keep the trash from the inside of the reel. At the rear side of the reel the stripper bars 33 should have sufficient clearance between them to permit the teeth 28 in their rotation to pass downwardly therethrough even though they may be bent or sprung more or less from their normal positions, but at the front these bars may be brought more closely together, if desired, by making them wider, for instance, so long as the teeth may withdraw therethrough in their upward travel. At the upper part of the front the bars may even touch at their edges or the sheet be solid, that is, above the line of withdrawal of the teeth inside the same. Any small amount of litter that may work itself into the inside of the reel will eventually find its way out the open right end adjacent or into the furrow. These stripper bars also serve to protect the sweeper against obstructions, to raise the sweeper to pass thereover, or if the trash material is in humps to push the same over and along and flatten or so spread it that the sweeper can handle it.

The forward portion of the reel frame is preferably tipped upward slightly, as indicated (Figs. 5 and 7), and the stripper bars 33 slantingly brought up to it, thus giving room for the approach to the trash, for the same to be thrown up thereunder, the material to be started rolling and the roll to be formed, confined and eventually directed and delivered into the furrow in front of the tractor wheel. Due to the small space under the tractor and the small size of the sweeper, this raising of the front bar of the sweeper frame gives it the effect of a larger sweeper and handles the trash better and more of it and does not take up any more room under the tractor.

The operation will be clear from the foregoing. With the sweeper unit mounted under and attached to the tractor substantially as described, the adjustments made for positioning the sweeper for the particular work and conditions in hand, that is, the sweeper adjusted forward or back, sidewise or angularly, the castor wheel adjusted up or down, the sweeper teeth adjusted as to their vertical inclination, and the driving belt 51 properly tightened, the machine is ready for sweeping. When not sweeping but the tractor is being moved, the sweeper may be raised by operation of the hand levers 40 and 48 adjacent the driver's seat. In actual sweeping position, with the right rear wheel of the tractor down in the furrow, the ends of the sweeper are lowered to the extent necessary. One end may be lowered more than the other, if desired, according to the depth of the furrow being plowed and the transverse slant of the tractor caused thereby. If it be found on trial that the conditions require some readjustment, the same may be readily done at the time.

In sweeping, the sweeper reel is rotated in a counter-clockwise direction by the take-off power drive of the tractor. This is through the medium of the driving belt 51, shaft 62, the end belt 60 and shaft 25. This rotates the sets of sweeper teeth 28 to engage and sweep the trash on the ground forwardly in advance of the stripper bars 33 and under the roll-controlling shield 35—36. The sweeper teeth are maintained in their vertical position by the arms 29 on the shafts 27, the arms 30 on the cam ring 31, and the eccentric cam 32, in a manner well known in connection with devices of this general nature, and need not be further described. The stripper bars 33 strip the litter from the teeth in their upward travel and push it forward with a motion tending to cause it to roll, and the shield 35—36 still further causes the material to roll and to confine it into a more or less compact roll or twist which travels endwise under the shield and is directed and delivered into the furrow just in advance of the large tractor wheel, which effectively crushes it down into the bottom of the furrow so that the plow following the wheel entirely covers the trash.

The teeth 28 of the sweeper are of spring material so that they may give if obstructions are encountered and then spring back into position. The shield 35—36 serves as a wind break and the hinged portion 36 may swing back if obstructions are encountered. On a windy day, light trash tends to blow back against the sweeper and not to travel into the furrow, but this is prevented by the shield. Also, with corn stalks there are liable to be a considerable number of longer stalks and corn stubs which the sweeper teeth, owing to the speed at which they operate, tend to throw out onto the plowed ground, but the shield stops them and puts them down into the furrow where the large tractor wheel catches and crushes them into the bottom of the furrow and the plow covers them nicely. The weight of the sweeper is carried by the cables 43 and 47, which permit the entire unit to rise to pass over obstructions if encountered, while limiting its downward movement to that to which it is adjusted. The side rods 37 and 38 take the backward thrust on the sweeper and propel it forwardly with the tractor. The diagonal brace 75 maintains the position of the sweeper unit with reference to the tractor and prevents it from rocking or swinging.

As stated at the outset, authorities say that the best-known remedy for the corn borer is to plow under completely the stalks infested therewith. The disastrous effects of the corn borer can best be appreciated by comparison of the ears of corn from uninfested and infested stalks grown adjacently—the one a full-sized ear filled solidly and completely with rows of full-sized kernels; the other a small nubbin with loose rows of small chaff-like kernels.

With this invention a power-operated trash-sweeper machine has been provided which collects and sweeps the surface trash, including such as corn stalks, into the furrow immediately ahead of the furrow wheel of its tractor and which wheel compresses the trash into the bottom of the furrow so that the plow drawn by the tractor and following the wheel thoroughly buries it.

Various changes and alterations may be made in the invention without departing from the principle or scope thereof as defined or intended to be defined herein and by the following claims.

I claim:

1. In trash-sweeping apparatus, in combination, a plowing tractor having a drive wheel adapted to run in a furrow already plowed and a plow following the said wheel, a rotary side delivery reel rake sweeper located under the tractor body with its delivery end adjacent the front of the rear furrow wheel of the tractor and power-operated by the tractor, said sweeper including a frame, longitudinal thrust bars connecting the ends of the frame with the tractor structure in the rear with provision for limited lateral movement of the frame, a flexible suspension for the ends of the frame to the tractor body above, and a diagonal bar across the space between the said thrust bars connected at its ends to prevent rocking or swinging of the said frame.

2. A surface trash sweeper for plowing tractors comprising a rotary reel rake sweeper adapted to be located beneath a tractor body between the front and rear wheels thereof and in an angular relation to the line of travel thereof, said sweeper being of a length to sweep a swath in advance and in the path of the plow drawn by the tractor and alongside a previously plowed furrow of a width corresponding to the strip plowed by the tractor and positioned to deliver the swept trash laterally at the side into the said furrow in front of the rear tractor wheel running therein, and baffling means in front of the sweeper to confine the swept trash to a limited space and to direct it into the furrow.

3. A surface trash sweeper for plowing tractors comprising a rotary reel rake type of sweeper adapted to be located beneath a tractor body between the front and rear wheels thereof and in an angular relation to the line of travel thereof, said sweeper being of a length to sweep a swath alongside a previously plowed furrow of a width corresponding to the strip plowed by the tractor and positioned to deliver the swept trash at the side into the said furrow in front of the rear tractor wheel running therein, means for rotating the sweeper from the tractor power, and a curved sheet metal directive baffle in front of and paralleling the angular sweeper to confine and direct the swept trash into the furrow.

4. A surface trash sweeper for plowing tractors comprising a frame, a rotary reel rake type of sweeper therein, said frame and sweeper being adapted to be located under a tractor body between the front and rear wheels thereof and in angular relation to the line of travel thereof with the rearward end adjacent the front of the rear furrow wheel of the tractor, means to connect the said frame with the tractor body to carry and propel the sweeper therefrom, means to rotate the sweeper by the power plant of the tractor, and a curved sheet-metal collecting baffle and shield secured to the frame in front of the rotary sweeper to confine the swept trash to a limited space and direct it into the furrow.

5. A surface trash sweeper for plowing tractors comprising a frame, a rotary sweeper therein, said frame and sweeper being adapted to be located under a tractor body between the front and rear wheels thereof and in angular relation to the line of travel thereof with the rearward end adjacent the front of the furrow wheel of the tractor, means to connect the said frame with the tractor body to carry and propel the sweeper therefrom, means to rotate the sweeper by the power plant of the tractor, and a curved sheet-metal baffle and windshield secured to the frame in front of the rotary sweeper to confine the swept trash to a limited space and direct it into the furrow, said shield or baffle including a hinged forward edge portion adapted to swing to pass over obstructions encountered in use.

6. For combination with a plow apparatus, which apparatus comprises a furrow-forming plow, a sub-combination attachment for said apparatus including a lateral shift trash sweeper having detachable means for mounting it on said apparatus in advance and in the path of said plow for sweeping the surface trash in front of the plow into a previously formed furrow to be covered by the plow following.

7. For combination with a plow apparatus, which apparatus comprises a furrow-forming plow and a tractor for propelling said plow having a wheel in advance of said plow which travels in a previously formed furrow, a sub-combination attachment for said apparatus including a lateral shift trash sweeper having detachable means for mounting it on said apparatus in advance of and in the path of said plow and in advance of said wheel for sweeping the surface trash in front of said plow into a previously formed furrow in front of said wheel to be pressed by said wheel against the bottom of said furrow to be covered by the following plow.

8. A trash sweeper attachment for plowing tractors drawing a plow or plows comprising a lateral shift side delivery rotary trash sweeper, attaching supports to detachably secure and carry the sweeper beneath the tractor body transversely thereof and between the front and rear wheels of the tractor and in advance and in the path of said plow or plows, said sweeper being of a length to sweep a strip of the land surface alongside a previously plowed furrow as wide as the furrow width of the plow or plows drawn by the tractor and positioned to deliver the swept trash laterally into the already plowed furrow immediately in front of the drive wheel of the tractor running in the furrow to be thereby crushed into the bottom of the furrow and into position to be completely and deeply covered by the plow immediately following the wheel of the said tractor and drawn thereby.

EDWARD WITTE.

REFERENCES CITED

The following references are of record in the file of this patent:

UNITED STATES PATENTS

| Number | Name | Date |
| --- | --- | --- |
| 1,296,227 | Strand | Mar. 4, 1919 |
| 1,348,605 | Todd | Aug. 3, 1920 |
| 1,435,293 | Grieves | Nov. 14, 1922 |
| 1,629,321 | Simpson | May 17, 1927 |
| 2,259,724 | Bartholow | Oct. 21, 1941 |
| 2,265,405 | Strantz | Dec. 9, 1941 |
| 2,296,065 | Slamp | Sept. 15, 1942 |

FOREIGN PATENTS

| Number | Country | Date |
| --- | --- | --- |
| 356,859 | Germany | Aug. 4, 1922 |
| 190,917 | Switzerland | Sept. 1, 1937 |